Figure 1:
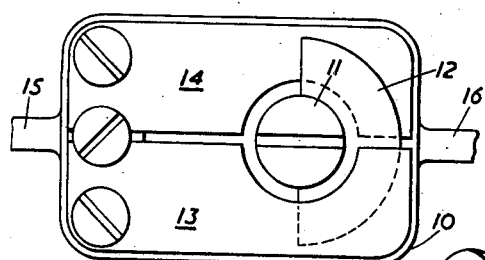

June 8, 1965

R. F. OXLEY 3,188,539

VARIABLE CAPACITOR WITH BIMETALLIC STATORS

Filed July 25, 1961

2 Sheets-Sheet 1

INVENTOR
ROBERT F. OXLEY

BY
Watson, Cole, Grindle + Watson,
ATTORNEYS

June 8, 1965 R. F. OXLEY 3,188,539
VARIABLE CAPACITOR WITH BIMETALLIC STATORS
Filed July 25, 1961
2 Sheets-Sheet 2

INVENTOR
ROBERT F. OXLEY

BY
Watson, Cole, Grindle & Watson
ATTORNEYS

United States Patent Office 3,188,539
Patented June 8, 1965

3,188,539
VARIABLE CAPACITOR WITH BIMETALLIC STATORS
Robert F. Oxley, Priory Park, Ulverston, England
Filed July 25, 1961, Ser. No. 126,574
Claims priority, application Great Britain, July 26, 1960, 26,005/60
9 Claims. (Cl. 317—248)

This invention relates to electric condensers of the air dielectric type.

It is an object of the invention to provide a condenser having a variable temperature coefficient of capacity, that is a condenser in which the relationship of the change in its capacity in response to a given change in temperature is variable.

An electric condenser according to the present invention comprises a conductive rotor assembly and a conductive stator assembly with an air gap between them, the rotor being mounted for rotation relatively to the stator, and temperature-responsive means which produce non-rotary relative movement between the rotor and at least a part of the stator in response to temperature changes, the rotor and the stator being so arranged that at a given temperature there is a range of rotational movement of the rotor relative to the stator over which both the area and the mean thickness of the air gap are constant and at all other temperatures the area of the air gap is constant but the mean thickness of the air gap is varied by rotational movement of the rotor relative to the stator.

Condensers embodying the invention have a wide variety of uses in electrical equipment where significant temperature changes are likely to be encountered, for instance in electrical equipment for aircraft. A condenser may be used in equipment having an unknown temperature coefficient to bring the equipment, which is in tune at normal temperature, back into tune at a temperature different from normal temperature by adjusting the condenser; and the equipment will be found to be in tune when the temperature returns to normal. Condensers embodying the invention can be made in very small sizes but nevertheless will be resistant to vibration.

Electric condensers according to the invention may take various forms.

In one form of electric condenser the rotor has a sector-shaped surface perpendicular to the axis of rotation of the rotor and the stator has a surface substantially parallel with and spaced from the sector-shaped surface by the air gap and covering at least the major part of the sector-shaped surface in all rotational positions of the rotor within the said range, the said stator surface being divided into two parts, at least one of which is moved by the temperature-responsive means in response to temperature changes.

If only one part of the stator surface is moved by the temperature-responsive means then the condenser will have only a positive or only a negative temperature coefficient but if both parts are moved by the temperature-responsive means they should be arranged to move in opposite directions and the rotor can be rotated to select a negative or positive temperature coefficient.

In a second form of electric condenser similar to the first the rotor comprises a sector-shaped vane and the stator has a first surface on one side of the vane and a second surface on the other side of the vane, the first and second surfaces being substantially parallel with and spaced from the opposite surfaces of the vane by portions of the air gap, at least one of the first and second surfaces of the stator being moved by the temperature-sensitive means in response to temperature changes. As in the first form the condenser can be arranged to have either a positive or a negative or both positive and negative temperature coefficients.

In a third form of electric condenser which, in effect, is a combination of the first and second forms the rotor has a sector-shaped vane perpendicular to the axis of rotation of the rotor and the stator has a first surface on one side of the vane and a second surface on the other side of the vane, the first and second surfaces being substantially parallel with and spaced from the opposite surfaces of the vane by portions of the air gap, the first and second surfaces both being divided into two parts, both of which parts are moved by the temperature-responsive means in response to temperature changes.

The stator surface (or surfaces) which is moved in response to temperature changes may comprise a vane which is at least partly of bimetallic construction.

In a fourth form the rotor has a number of axially spaced sector-shaped vanes arranged in two groups, vanes from the two groups alternating with one another in axial relationship and the two groups being circumferentially displaced with respect to one another, and there are stator vanes alternating with the rotor vanes, each stator vane being in two parts each part being moved by the temperature-responsive means in a generally axial direction opposite to that in which the other part of the respective stator vane is moved by the temperature-responsive means.

Figure 2:
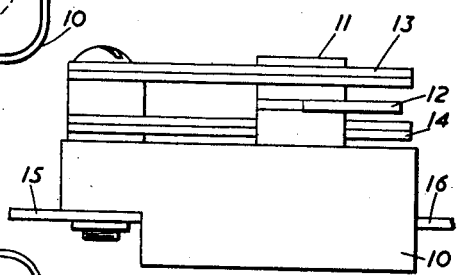
Figure 3:
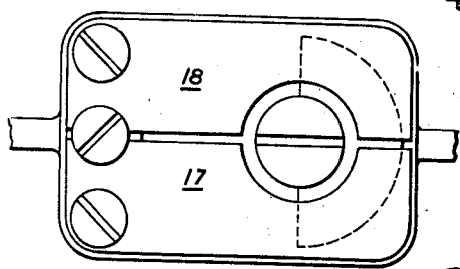
Figure 4:
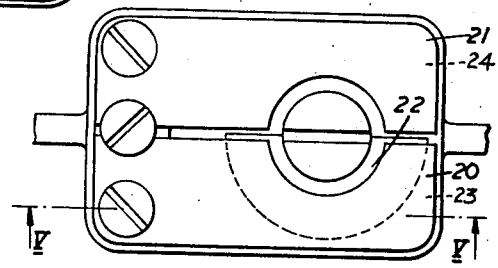
Figure 5:
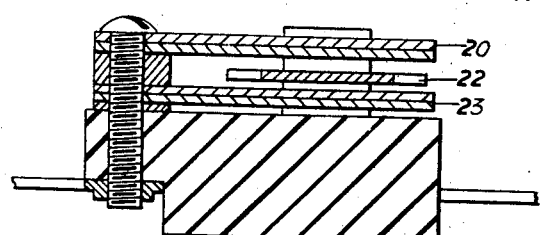
Figures 6, 7:
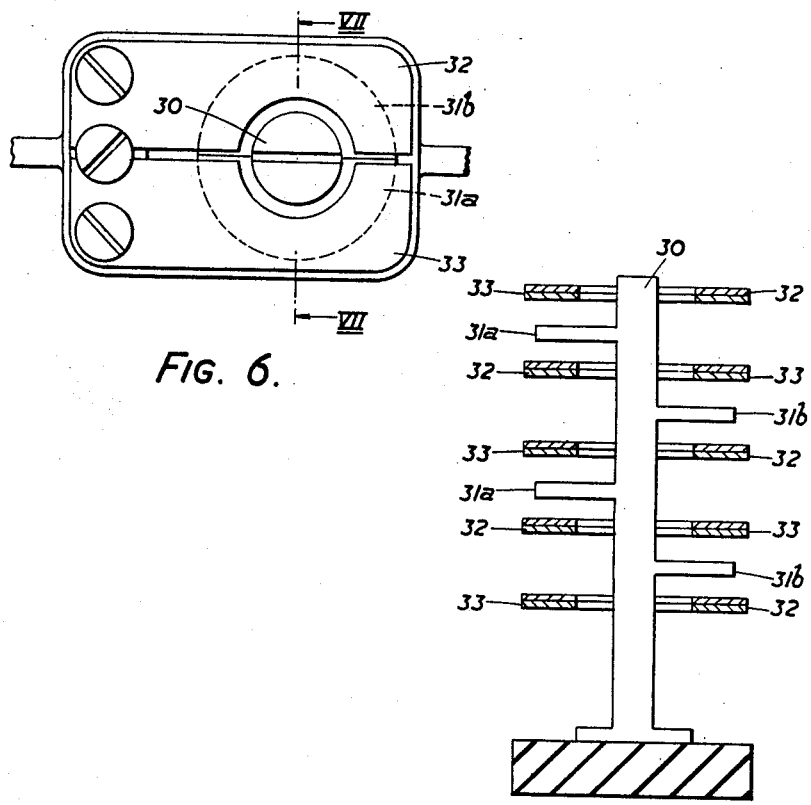

The invention may be performed in various ways and several embodiments will now be described by way of example with reference to the accompanying drawings, in which:

FIGURE 1 is a plan view of a simple condenser,
FIGURE 2 is a side elevation of the condenser shown in FIGURE 1;
FIGURE 3 is a plan view of a condenser which is similar to that shown in FIGURE 1;
FIGURE 4 is a plan view of a condenser which is, in effect, a combination of the arrangements shown in FIGURES 1 and 2 and FIGURE 3;
FIGURE 5 is a section on the line V—V of FIGURE 4;
FIGURE 6 is a plan view of a condenser having a rotor with a number of vanes; and
FIGURE 7 is a section on the line VII—VII of FIGURE 6.

The condenser shown in FIGURE 1 comprises an insulating base 10, in which is mounted a rotor assembly comprising a stud 11 which is mounted for rotation on the base 10 and a semi-circular vane 12 carried by the stud 11. The base 10 also carries a stator assembly comprising a pair of stator vanes 13 and and 14 which are in the form of short strips. The rotor assembly is electrically connected to a terminal 15 and the stator assembly is electrically connected to a terminal 16. The strip 13 is arranged slightly above the rotor vane 12 while the strip 14 is arranged slightly below the rotor vane 12. One of the strips 13, 14 is of bimetallic construction and moves away from or towards the rotor vane 12 as the temperture rises while the other strip is of a single metal. At a given normal temperature the two strips 13, 14 are at the same distance from the rotor vane 12 and rotation of the rotor will not affect the capacity of the condenser. However, the amount of the rotor vane 12 which is covered by the bimetal strip compared with the amount covered by the other strip, which amount can be varied by rotation of the rotor, will determine the variation in capacity of the condenser for a given rise in temperature. Such a condenser will have only a positive temperature coefficient or a negative temperature coefficient, that is to say on a rise in temperature the capacity of the condenser will either increase or decrease depending upon whether the bimetallic vane moves towards or away from the rotor vane 12. However in a similar embodiment the single-metal strip is replaced by a bimetallic strip which moves in the same direction as that of the other strip in response to the same change of temperature. For example the strip 13 might be arranged to move downwardly towards the vane 12 while the strip 14 also moves downwardly but in this case away from the vane 12 for the same change in temperature. Thus if the rotor vane 12 is rotated in an counterclockwise direction from the position shown in FIGURE 1 more of it will be affected by the vane 13 than by the vane 14 and consequently on a rise in temperature the total effective thickness of the gap between the rotor and stator will decrease. On the other hand if the vane 12 is rotated in a clockwise direction from the position shown in FIGURE 1 the effective thickness of the gap will increase on a rise in temperature.

The embodiment shown in FIGURE 3 is similar to that shown in FIGURES 1 and 2 except that the two strips 17 and 18 which correspond to the two strips 13 and 14 in FIGURES 1 and 2 are both above the rotor vane 12. As in the previous embodiment only one of the strips 17, 18 may be of bimetallic construction but if both are of bimetallic construction one should move upwardly and the other downwardly in response to the same temperature change.

In the condenser shown in FIGURES 4 and 5 there are two strips 20, 21 above the rotor vane 22 and two strips 23, 24 below the rotor vane. In this case the strips 20 and 23 are arranged to move apart, that is to say the strip 20 moves up and strip 23 moves down, and the strips 21 and 24 move together, that is to say strip 21 moves down and strip 24 moves up, in response to a temperature rise. This embodiment has a larger capacity than those shown in FIGURES 1 and 2 and FIGURE 3.

The embodiment shown in FIGURES 6 and 7 has a rotor shaft 30 having a number of semi-circular rotor vanes 31a and 31b. The rotor vanes are arranged in two groups, vanes from the two groups alternating in axial relation to one another and the vanes 31a of the first group being angularly displaced through 180° about the axis of the shaft 30, relative to the vanes of the second group 31b. The condenser is provided with a number of pairs of bimetallic strips forming the stator assembly similar to those previously described, alternate strips 32 being arranged to move upwardly and the remaining strips 33 being arranged to move downwardly in response to a temperature rise. It will be apparent that with the rotor in the position shown in FIGURES 6 and 7 a temperature rise from a given normal temperature will result in an increase in capacity of the condenser. If the rotor is rotated through 180° at the given normal temperature, there will be no change in the capacity of the condenser. If there is then a temperature rise from the given normal temperature, the capacity of the condenser will decrease. It will be seen that this embodiment is similar to that shown in FIGURES 4 and 5 but can produce a much greater change in capacity for a given change in temperature.

What I claim as my invention and desired to secure by Letters Patent is:

1. An electric condenser comprising a base structure, at least one plane rotor vane rotatably mounted on said base structure for rotation about an axis perpendicular to the plane of said vane, and a pair of plane stator vanes associated with each rotor vane and mounted on said base structure with their planes generally parallel to and spaced from the plane of said rotor vane providing an air gap therebetween, said stator vanes lying on opposite sides of said axis of rotation, at least one of each pair of said stator vanes being of temperature sensitive bimetallic construction and having a fixed end and a free end, said fixed end being mounted on said base structure and said free end being adjacent said rotor vane, whereby a change in temperature of said bimetallic stator vane causes said vane to move axially, thereby changing the mean thickness of said air gap.

2. An electric condenser comprising a base structure, a sector-shaped plane rotor vane having an axis of generation of said sector, said rotor vane being rotatably mounted on said base structure for rotation about said axis of generation to sweep out a circular path, and a pair of plane stator vanes associated with the rotor vane and lying on opposite sides of said axis of generation and spaced from said circular path providing an air gap therebetween, each stator vane consisting of a temperature sensitive bimetallic strip having two opposite end portions, one end portion of each of said strips being secured to said base structure and the other end portion of each of said strips being disposed in overlapping relationship to said circular path whereby a change in temperature of said stator vanes causes them to move axially, thereby changing the mean thickness of said air gap.

3. An electric condenser comprising a base structure, a stud rotatably mounted on said base structure for rotation about an axis, a laminar rotor vane projecting from said stud in a plane perpendicular to the axis of said stud, and four stator vanes, each stator vane being in the form of a temperature sensitive bimetallic strip having opposite end portions, one of said end portions of each strip being secured to said base structure, a first pair of said strips lying in a common plane and on opposite sides of said axis of rotation, the second pair of said strips lying in a second common plane and on opposite sides of said axis of rotation, said common planes being parallel to the planes in which said rotor vane lies with the plane in which said rotor vane lies between said common planes with air gaps between adjacent planes, whereby a change in temperature of said stator vanes causes them to move axially, thereby changing the mean thickness of said air gap.

4. An electric condenser according to claim 3 in which said rotor vane is semicircular.

5. An electric condenser according to claim 3 in which said strips have longitudinal axes which are parallel to one another.

6. An electric condenser comprising a support structure, a shaft rotatably mounted on said support structure for rotation about an axis, a plurality of rotor vanes projecting from said shaft in parallel planes perpendicular to said axis, said rotor vanes being distributed between a first series and a second series, the vanes of said first series alternating with the vanes of said second series along said shaft and being angularly displaced about said axis with respect to the vanes of said second series, and a plurality of pairs of temperature sensitive bimetallic strips each consisting of two metals of different coefficients of thermal expansion, said pairs of strips alternating with said rotor vanes along said shaft with air gaps therebetween, the strips of each said pair lying generally in a plane perpendicular to said axis, each strip having a fixed end which is rigidly secured to said support structure at a point remote from said axis and a free end which is adjacent said axis, the strips of each pair having the metal of higher coefficient of thermal expansion adjacent opposite ends of said shaft, whereby a change in temperature of said bimetallic strips causes them to move axially, thereby changing the means thickness of said air gap.

7. An electric condenser according to claim 6 in which said rotor vanes are semicircular and the vanes of said first series are angularly displaced by 180° about said axis with respect to the vanes of said second series.

8. An electric condenser according to claim 6 in which the strips of each said pair of strips have longitudinal axes which extend parallel to one another on opposite sides of a plane containing said axis of rotation of said shaft.

9. An electric condenser comprising a base structure, a plane rotor vane structure rotatably mounted on said base structure for rotation about an axis perpendicular to the plane of said vane structure, a plane stator vane structure mounted on said base structure parallel with said rotor vane structure with an air gap therebetween, one of said vane structures consisting of two parts, each of said parts being of bimetallic construction and having a fixed end and a free end, said free end being positioned adjacent to the other of said vane structures, one of said parts having the metal of lower coefficient of thermal expansion on the side of said one part adjacent the other of said vane structures and the other of said parts having the metal of higher coefficient of thermal expansion on the side of said other part adjacent the other of said vane structures, whereby a change in temperature of said vane structure consisting of bimetallic parts causes it to move axially, thereby changing the mean thickness of said air gap.

References Cited by the Examiner

UNITED STATES PATENTS

| | | | |
|---|---|---|---|
| 2,123,050 | 7/38 | Johnson | 317—248 X |
| 2,151,752 | 3/39 | Ellis | 317—248 |
| 2,185,355 | 1/40 | Peterson | 317—248 X |

FOREIGN PATENTS

| | | |
|---|---|---|
| 432,987 | 8/35 | Great Britain. |
| 458,691 | 12/36 | Great Britain. |

OTHER REFERENCES

Dummer, G. W., and Nordenberg, H. M.: "Fixed and Variable Capacitors," McGraw-Hill, New York (1960), page 238 relied on. QC 587D8f.

JOHN F. BURNS, *Primary Examiner.*